US009699949B2

(12) United States Patent
Lykken et al.

(10) Patent No.: US 9,699,949 B2
(45) Date of Patent: Jul. 11, 2017

(54) WING POSITIONING APPARATUS (71) Applicant: NORWOOD SALES Inc., Horace, ND (US)

(72) Inventors: Tom Lykken, Fargo, ND (US); Matt Meyer, Fargo, ND (US)

(73) Assignee: NORWOOD SALES, Inc., Horace, ND (US)

( * ) Notice: Subject to any disclaimer, the term of this patent is extended or adjusted under 35 U.S.C. 154(b) by 0 days.

(21) Appl. No.: 14/619,291

(22) Filed: Feb. 11, 2015

(65) Prior Publication Data
US 2015/0223385 A1    Aug. 13, 2015

Related U.S. Application Data (60) Provisional application No. 61/938,546, filed on Feb. 11, 2014.

(51) Int. Cl.
A01B 51/04 (2006.01)
A01B 73/02 (2006.01)
A01B 73/00 (2006.01)
A01C 7/20 (2006.01)

(52) U.S. Cl.
CPC ............ A01B 51/04 (2013.01); A01B 73/00 (2013.01); A01B 73/02 (2013.01); A01C 7/208 (2013.01)

(58) Field of Classification Search
CPC ......... A01B 51/04; A01B 63/10; A01B 63/02; A01B 63/14–63/22; A01B 73/02; A01B 73/00; A01C 7/208
USPC ................. 172/311, 383, 313, 400, 412, 406
See application file for complete search history.

(56) References Cited

U.S. PATENT DOCUMENTS

| 3,162,459 | A | 12/1964 | Marmorine et al. |
| 4,286,672 | A | 9/1981 | Forsyth et al. |
| 7,740,084 | B2 | 6/2010 | Rosenboom |
| 7,854,272 | B2* | 12/2010 | Friggstad ............. A01B 73/065 172/311 |
| 8,342,256 | B2 | 1/2013 | Adams et al. |
| 2006/0090910 | A1* | 5/2006 | Houck ................. A01B 59/042 172/272 |

(Continued)

FOREIGN PATENT DOCUMENTS

WO    WO-2015123310 A1    8/2015

OTHER PUBLICATIONS

"International Application Serial No. PCT/US2015/015436, International Search Report mailed May 18, 2015", 2 pgs.

(Continued)

Primary Examiner — John G Weiss
(74) Attorney, Agent, or Firm — Schwegman, Lundberg & Woessner, P.A.

(57) ABSTRACT

A farm implement supported by at least one wheeled support mounted on a pivot arm extending from a wing and at least one tracked support on a main carrier. The tracked support can be rotated about a primary rotational axis and the wheeled support being rotatable about a secondary rotational axis. The pivot arm can be rotated to position the wheeled support to elevate or lower the wing. The rotational of the pivot arm also changes the alignment of the secondary rotational axis of the winged support relative to the primary rotational axis of the tracked support to prevent berming when maneuvering the farm implement.

18 Claims, 8 Drawing Sheets (56) References Cited

U.S. PATENT DOCUMENTS

2015/0223387 A1* 8/2015 Lykken ............... A01B 73/065
172/388

OTHER PUBLICATIONS

"International Application Serial No. PCT/US2015/015436, Written Opinion mailed May 18, 2015", 7 pgs.
"International Application Serial No. PCT/US2015/015436, International Preliminary Report on Patentability mailed Aug. 25, 2016", 9 pgs.

* cited by examiner

WING POSITIONING APPARATUS

CLAIM OF PRIORITY

This patent application claims the benefit of priority, under 35 U.S.C. Section 119(e), to Tom Lykken et al. U.S. Patent Application Ser. No. 61/938,546, entitled "LIMIT RAISE BERMING IMPROVEMENT," filed on Feb. 11, 2014, each of which is hereby incorporated by reference herein in its entirety.

TECHNICAL FIELD

This document pertains generally, but not by way of limitation, to farm implements having adjustable height wings.

BACKGROUND

Farm implements often have a main carrier that can be towed behind a tractor or other motorized farm machinery. Certain implements, such as planting implements, have wings on which a plurality of features is positioned. The wings extend transversely from the main carrier to align each of the features with a row to be planted or processed when the farm implement is towed along an axis parallel to the rows. Farm implements are often sized such that about 48 rows can be simultaneously processed resulting in wings that are each about 60 ft. or greater in length. The wings are often attached to the main carrier in a hinged configuration such that the wings can be folded against the main carrier to transport the main carrier when not being operated.

As farm implements are used on loose soil, the weight of the farm implement must be distributed over sufficient surface area such that the farm implement "floats" over the soil without sinking into the soil or overly compacting the soil. Certain farm implements support the main carrier, where the majority of the weight of the farm implement is centered, with a tracked support that distributes the weight over a larger surface area. Similarly, a wheeled support is often mounted on the wing to support the wings and prevent flexing of the long wings when extended from the main carrier. A wheeled support provides adequate support for the wings while minimizing the disruption of the soil.

Tracked supports have an effective rotational axis at the center of the track assembly. As a result, the effective rotational axis for the track assembly is typically well forward of the wings. In contrast, the wheeled supports are typically positioned proximate the wing frame to avoid interfering with the folding of the wings such that the rotational axis for the wheels of the wheeled support is well rearward of the rotational axis for the track assembly. The differences between the rotational axes causes dragging of the wheel supports during turning of the farm implement, which can result in "berming" or ridging of the soil. Berming can cause seed disruption, water pockets and uneven fields.

While the tracked support and wheeled support combination can effectively distribute the weight of the farm implement over sufficient area, the arrangement can cause severe soil damage particularly at the edges of the fields where the farm implement is turned.

OVERVIEW

The present inventors have recognized, among other things, that a problem to be solved can include distributing the weight of a farm implement on a combination of tracked supports and wheeled supports without berming soil during operation of the farm implement. In an example, the present subject matter can provide a solution to this problem, such as by providing a farm implement supported by at least one wheeled support on a pivot arm extending from a wing and at least one tracked support on a main carrier. The tracked support can be rotated about a primary rotational axis and the wheeled support being rotatable about a secondary rotational axis. The pivot arm can be rotated to position the wheeled support to elevate or lower the wing. The rotational of the pivot arm also changes the alignment of the secondary rotational axis of the winged support relative to the primary rotational axis of the tracked support.

The pivot arm can be rotated into an operational position to extend the wheeled support forward from the wing and lower the wing closer to an underlying ground surface. In the operational position, the wheeled support is positioned such that the secondary rotational axis is forward of the primary rotational axis. The pivot arm can also be rotated into a turn position in which the wheeled support is rotated rearward toward the wing to elevate the wing and such that the wheeled support is positioned to generally align the secondary rotational axis with the primary rotational axis. In the turn position, the farm implement can be turned about the main carrier with minimal dragging of the wheeled support on the wing. In at least one example, the pivot arm can be rotated into an elevated position in which the wheeled support is positioned to elevate the wing and the secondary rotational axis is rearward of the primary rotational axis. The wing can be elevated higher when the wheeled support is positioned in the elevated position then when the wheeled support is positioned in the turn position. In the elevated position, the wing is elevated to provide sufficient clearance beneath the wing for pivoting the wing relative to the main carrier into a stowed position against the main carrier.

A farm implement, according to an example of the present disclosure, can comprise a main carrier including a tracked support rotatable about a primary rotational axis and a wing pivotably connected to the main carrier. The farm implement can also include a wing support assembly that can comprise a pivot arm rotatably mounted to the wing, and at least one wheeled support positioned on the pivot arm. The pivot arm can be rotated to position the wheeled support in at least an operational position and a turn position, wherein the wheeled support is positioned such that the secondary rotational axis is forward of the primary rotational axis in the operational position and the wheeled support is positioned to align the secondary rotational axis is generally aligned with the primary rotational axis in the turn position.

In an example, a method for maneuvering a farm implement having a main carrier supported by a tracked support rotatable about a primary rotational axis and a wing supported by a wheeled support mounted on a pivot arm rotatably connected to the wing. The wheeled support can be rotated about a secondary rotational axis. The method can comprise rotating the pivot arm to position the wheeled support into an operational position to lower the lower wing. The secondary rotational axis can be positioned forward of the primary rotational axis in the operational position. The method can also include rotating the pivot arm to position the wheeled support into a turn position to elevate the lower wing. The secondary rotational axis can generally align with the primary rotational axis in the turn position. The method can also include turning the farm implement about the main carrier when the wheeled support is positioned in the turn position.

A system for positioning a wing pivotably connected to a main carrier supported by a tracked assembly rotatable about a primary rotational axis, according to an example, can comprise an arm mount positioned on the wing and a pivot arm rotatably mounted to the arm mount such that the pivot arm extends from the wing. The system can also include at least one wheeled support positioned on the pivot arm. The pivot arm can be rotated to position the wheeled support in at least an operational position and a turn position, wherein the wheeled support is positioned such that the secondary rotational axis is forward of the primary rotational axis in the operational position and the wheeled support is positioned to align the secondary rotational axis is generally aligned with the primary rotational axis in the turn position.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
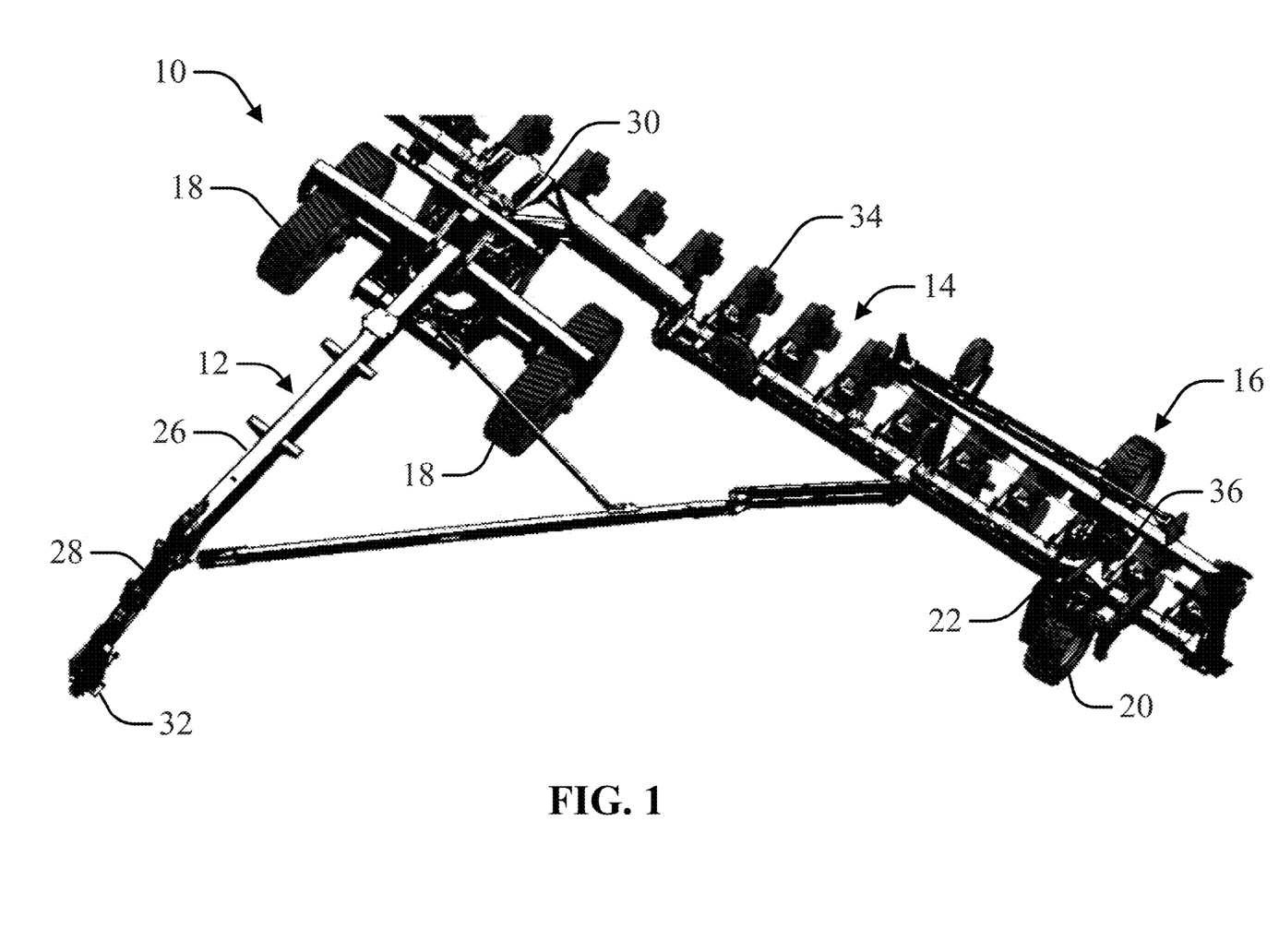
FIG. 1 is a partial perspective view of a farm implement having at least one wing support assembly according to an example of the present disclosure.

As depicted in FIG. 1, a farm implement 10, according to an example of the present disclosure, can comprise a main carrier 12, at least one wing 14 and at least one wing support assembly 16. The main carrier 12 can include at least one tracked support 18 rotatable about a primary rotational axis A-A. The wing support assembly 16 can include a wheeled support 20 positioned on a pivot arm 22 extending from the wing 14. The wheeled support 20 is rotatable about a secondary rotational axis B-B. The pivot arm 22 can be rotated to extend forward from the wing 14 to lower the wing 14 adjacent an underlying ground surface and position the wheeled support 20 in an operational position. In the operational position, the wheeled support 20 can be positioned such that the secondary rotational axis B-B is forward of the primary rotational axis A-A. For the purposes of this discussion, the forward direction of the farm implement 10 refers to front end of the farm implement 10 when the farm implement 10 is towed forward during a conventional operation. The pivot arm 22 can be rotated rearward to the wing 14 to elevate the wing 14 and position the wheeled support 20 in a turn position. In the turn position, the wheeled support 20 can be positioned such that the secondary rotational axis B-B is generally aligned with the primary rotational axis A-A.

Figure 2:
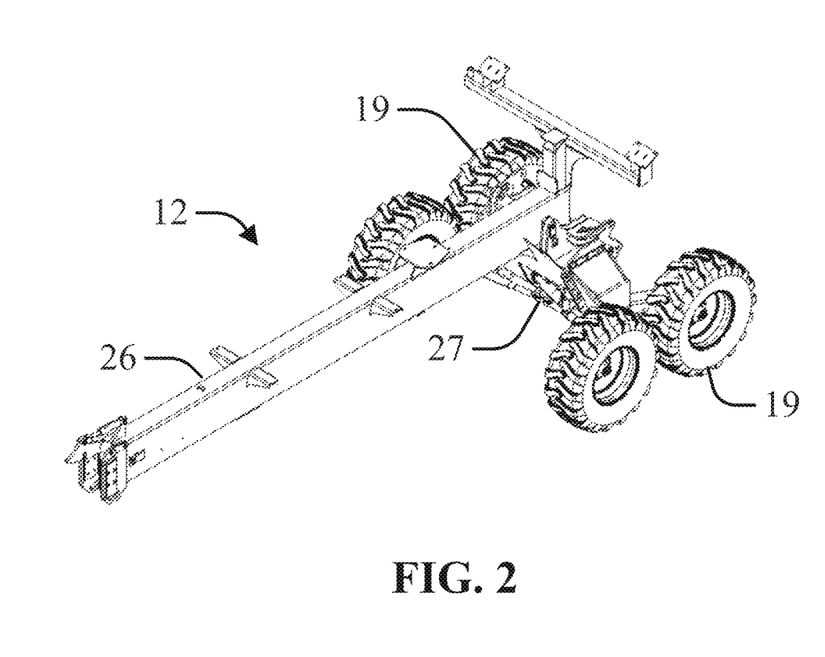
FIG. 2 is a partial perspective of a main carrier of a farm implement according to an example of the present disclosure.

As depicted in FIGS. 1-2, the main carrier 12 can comprise a main body 26, a tracked support 18 and a telescoping portion 28. The tracked support 18 can be positioned beneath the main body 26 to support the main body 26. The tracked support 18 can include a plurality of rollers supporting a track rotatable about the primary rotational axis A-A. In an example, the main body 26 can include a hinge assembly 30 for rotatably connecting each wing 14 to the main body 26 such that the wing 14 can rotate relative to the main carrier 12. The hinge assembly 30 can be positioned at the rear end of the main body 26 such that the wings 14 are positioned rearward of the tracked support 18 and the primary rotational axis A-A. As depicted in FIG. 2, in at least one example, the main body 26 can comprise at least one wheeled support 19 in addition to or in place of the tracked support 18. Each wheeled support 19 can include a plurality of wheels arranged in a linear fashion to support the weight of the main carrier 12 in a similar manner to the tracked support 18. The wheels can be arranged in a fixed such that the wheels rotate in a single plane. As depicted in FIG. 2, in an example, the main carrier 12 can include a positioning apparatus 27 for individually the wheels or simultaneously pivoting two or more wheels.

In an example, the telescoping portion 28 can be slidably connected to the main body 26 such that the telescoping portion 28 is slidable between a retracted position and an extended position. In at least one example, the main body 26 comprises a sleeve for slidably receiving the telescoping portion 28. The main body 26 can include an extending apparatus for moving the telescoping portion 28, which can include, but is not limited to a hydraulic piston, a pulley system, a toothed track and other motorized elements for extending or retracting the telescoping portion 28. In an example, the telescoping portion 28 can also comprise a hitch assembly 32 for operably connecting the main carrier 12 to a tractor or other motorized machinery for towing of the main carrier 12.

Figure 3:
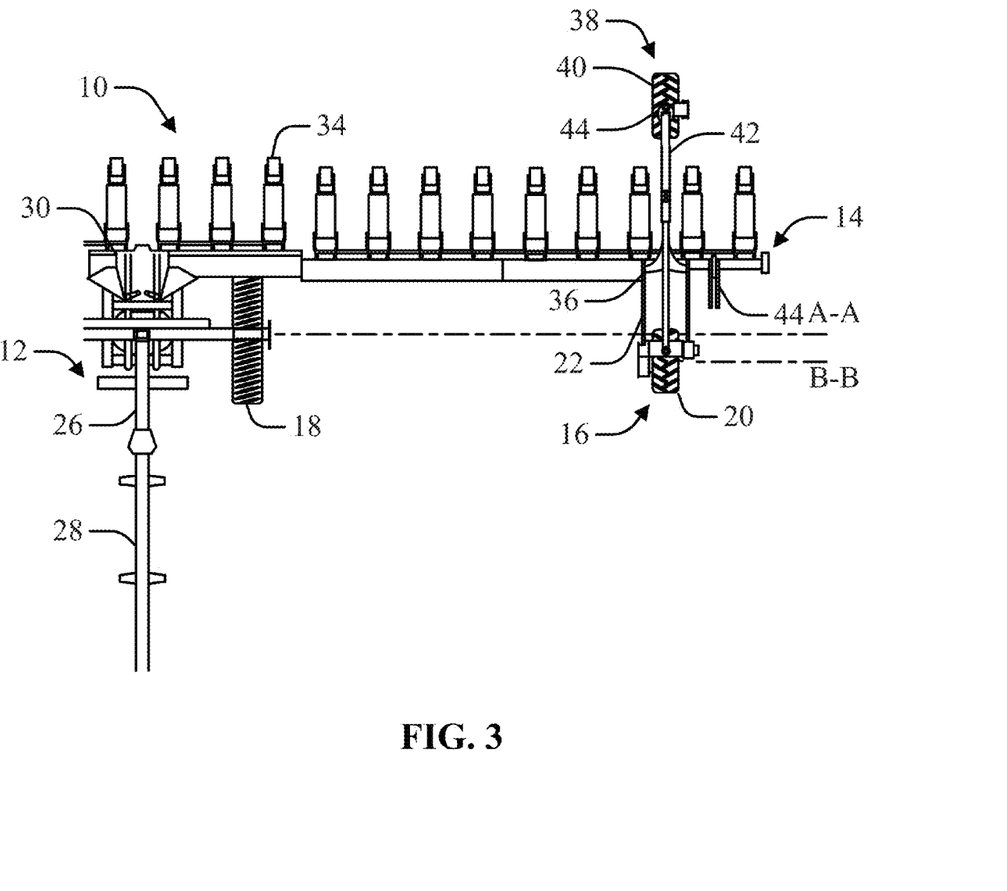
FIG. 3 is a partial top view of a farm implement having at least one wing support assembly having a wheeled support positioned in an operational position according to an example of the present disclosure.
Figure 5:
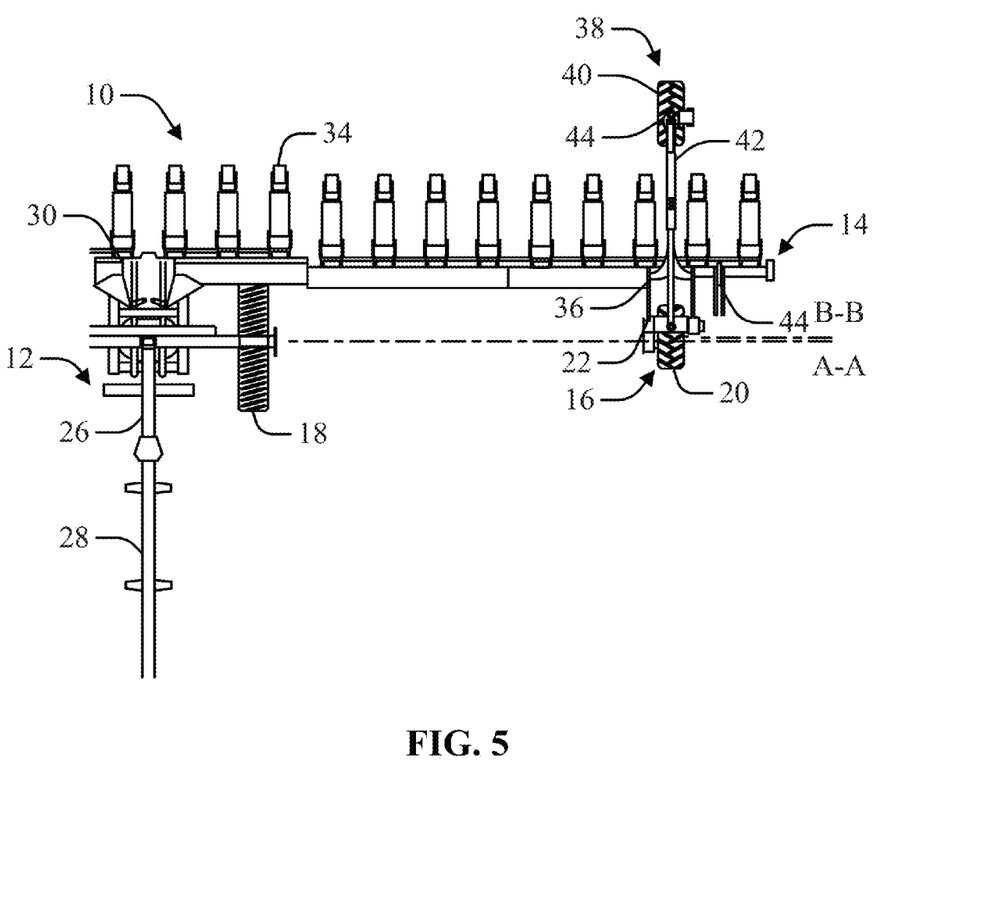
FIG. 5 is a partial top view of a farm implement having at least one wing support assembly having a wheeled support positioned in a turn position according to an example of the present disclosure.
Figure 6:
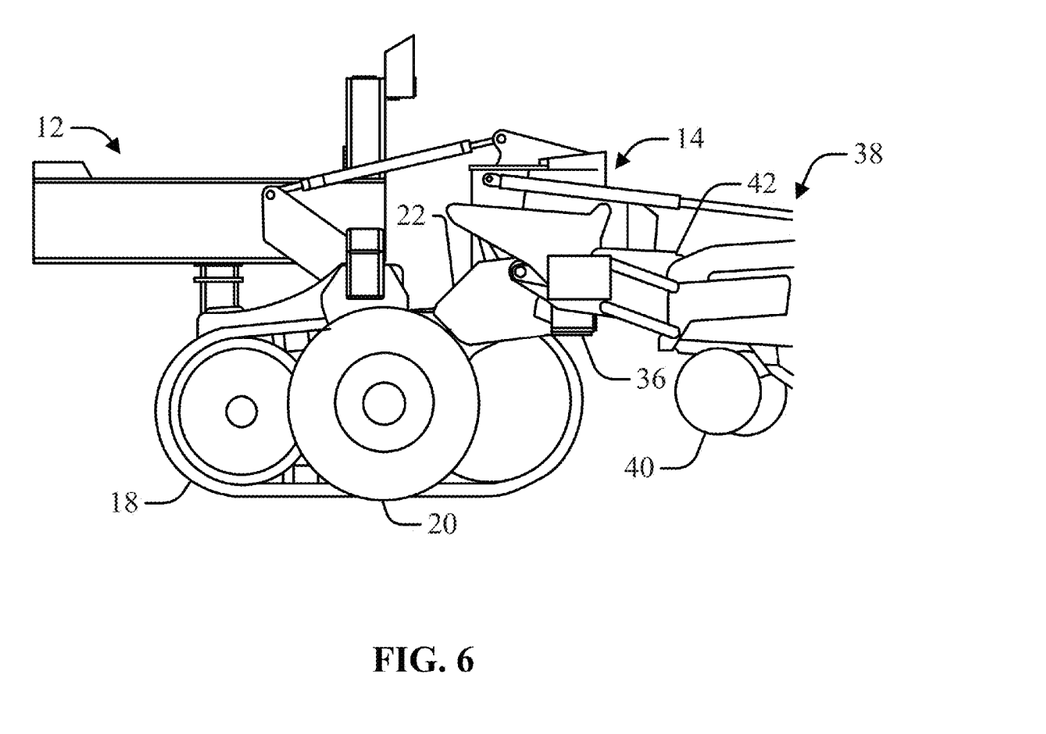
FIG. 6 is a partial side view of a farm implement having at least one wing support assembly having a wheeled support positioned in a turn position according to an example of the present disclosure.

In an example, each wing 14 can be rotatably connected to the hinge assembly 30. Each wing 14 can be rotated between a deployed position in which the wing 14 transversely from the main carrier 12 and a stowed position in which the wing 14 is positioned parallel to the main carrier 12. As depicted in FIG. 1, in at least one example, the end of each wing 14 is proximate to the hitch assembly 32 when the wing 14 is rotated into the stowed position. In at least one example, a plurality of features 34 can be positioned on each wing 14. The features 34 can be spaced apart on the wings 14 such that each feature 14 aligns with a row to be planted or processed when the wing 14 is positioned in the deployed position. As depicted in FIGS. 3, 5 and 6, the features 34 comprise planters for depositing seeds in rows, but can comprise blades, sprayers or other features for processing the rows. In the operational position, the wing 14 can be lowered such that the features 34 are positioned adjacent an underlying ground surface.

As depicted in FIGS. 3-8, at least one wing support assembly 16 can include an arm mount 36, a pivot arm 22 and at least one wheeled support 20. The arm mount 36 can be positioned on the wing 14 a predetermined distance from the hinge assembly 30. The positioning of the arm mount 36 corresponds to a fulcrum point for supporting the weight of the wing 14 in cooperation with the main carrier 12 without the wing 14 flexing or bending. In an example, the predetermined distance is at least more than ½ the length of the wing 14. In yet another example, the predetermined distance is at least more than ⅔ the length of the wing 14.

Figure 4:
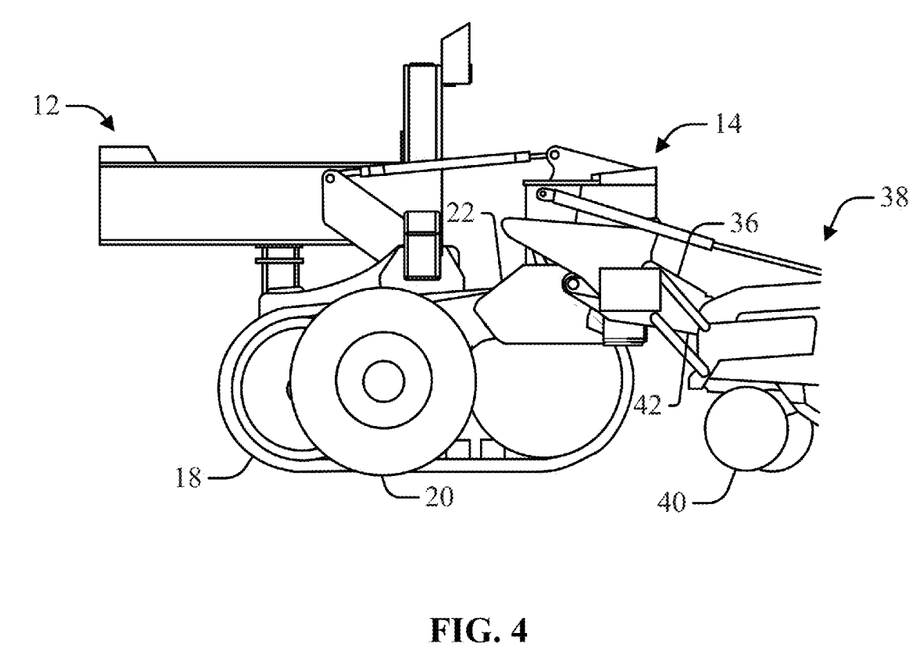
FIG. 4 is a partial side view of a farm implement having at least one wing support assembly having a wheeled support positioned in an operational position according to an example of the present disclosure.

The pivot arm 22 can be rotatably mounted to the arm mount 36 such that the pivot arm 22 extends from the wing 14. The wheeled support 20 can be positioned on the pivot arm 22 such that rotating the pivot arm 22 rotates the wheeled support 20. The pivot arm 22 can be rotated to position the wheeled support 20 in an operational position as depicted in FIGS. 3-4. In the operational position, the pivot arm 22 extends forward from the wing 14 to lower the wing 14 adjacent an underlying ground surface and position the wheeled support 20 such that the secondary rotational axis B-B is positioned forward of the primary rotational axis A-A. The farm implement 10 can be towed with the wings 14 lowered into the operational positions to plant seeds or perform other processes to the underlying ground surface.

The pivot arm 22 can also rotated to position the wheeled support 20 in a turn position as depicted in FIGS. 5-6. In the turn position, the pivot arm 22 can rotate the wheeled support 20 rearward from the operational position such that the secondary rotational axis B-B is generally aligned with the primary rotational axis A-A. In an example, the secondary rotational axis B-B is positioned within about 1 inches to about 12 inches of the primary rotational axis A-A when the wheeled support 20 is positioned in the turn position. In another example, the secondary rotational axis B-B is positioned within about 1 inches to about 6 inches of the primary rotational axis A-A when the wheeled support 20 is positioned in the turn position. In yet another example, the secondary rotational axis B-B is positioned within about 1 inches to about 3 inches of the primary rotational axis A-A when the wheeled support 20 is positioned in the turn position. In at least one example, the primary rotational axis A-A is generally parallel with the secondary rotational axis B-B. The alignment of the primary rotational axis A-A and the secondary rotational axis B-B allows the farm implement 10 to be turned about the main carrier 12 with minimal dragging of the outer wheeled support 20.

Figure 7:
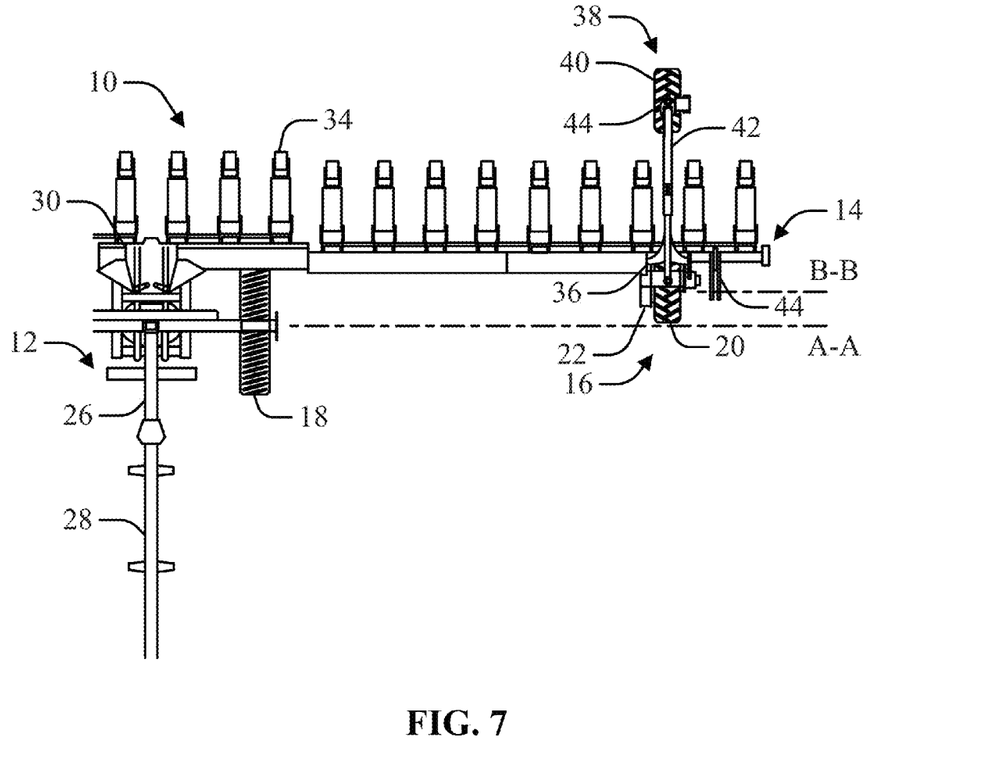
FIG. 7 is a partial top view of a farm implement having at least one wing support assembly having a wheeled support positioned in an elevated position according to an example of the present disclosure.
Figure 8:
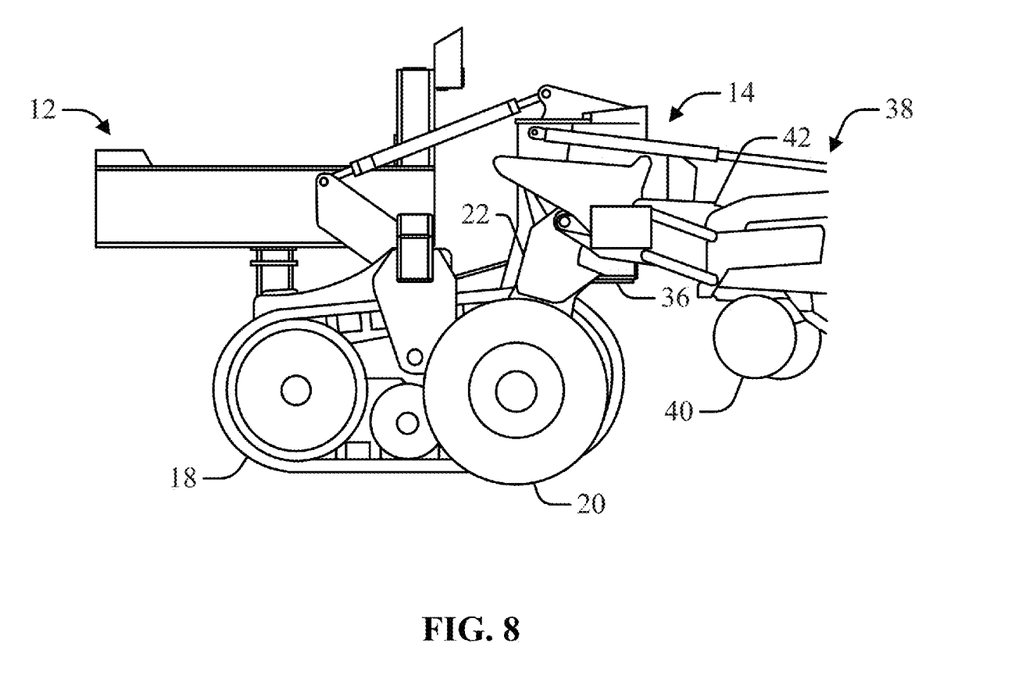
FIG. 8 is a partial side view of a farm implement having at least one wing support assembly having a wheeled support positioned in an elevated position according to an example of the present disclosure.

The pivot arm 22 can also rotated to position the wheeled support 20 in an elevated position as depicted in FIGS. 7-8. In the elevated position, the pivot arm 22 can rotate the wheeled support 20 rearward to elevate the wing 14 and position the wheeled support 20 such that the secondary rotational axis B-B is rearward of the primary rotational axis A-A. In an example, the wing 14 is higher when the pivot arm 22 is rotated into the elevated position than when the pivot arm 22 is rotated into the turn position. In at least one example, the pivot arm 22 can be positioned to extend generally downward to elevate the wing 14. In the elevated position, the clearance between the underlying ground surface and the wing 14 is increased allowing the wing 14 to be moved with less risk of impacting an object on the underlying ground surface. In an example, the wings 14 can be rotated into the stowed position while the pivot arm 22 is positioned in the elevated position.

In an example, the farm implement 10 can further include a trailer wheel assembly 38 having a trailer wheeled support 40 positioned on a support arm 42. As depicted in FIGS. 2, 4 and 6, in at least one example, the trailer wheeled support 40 is rotatably mounted to the support arm 42 by a hinge assembly 44. The hinge assembly 40 can permit the rotational axis of the trailer wheeled support 40 to pivot relative to the primary rotational axis A-A to prevent berming while rotating the farm implement 10 about the main carrier 12. As depicted in FIGS. 3, 5 and 7, in at least one example, the support arm 42 is pivotably mounted to the arm mount 36 such that the trailer wheeled support 40 can be rotated out of engagement with the underlying ground surface. The trailer wheeled support 40 can be positioned independently or with the wheeled support 20 when the wheeled support 20 is positioned in the turn position or elevated position.

In at least one example, each wing 14 can include a hook element 44 that can be moved to selectively engage to the main carrier 12. The hook element 44 can engage the main carrier 12 when the wings 14 are positioned in the stowed position to elevate the corresponding wing 14 relative to the main carrier 12. The wing 14 can be elevated such that the wing support assembly 16 is lifted off the ground and the entire farm implement 10 is supported by the tracked support 18. This arrangement reduces rolling resistance from the wing support assembly 16 allowing for efficient transport of the farming implement 10.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A farm implement, comprising:
a main carrier including a tracked support rotatable about a primary rotational axis;
a wing pivotably connected to the main carrier; and
a wing support assembly, comprising a pivot arm rotatably mounted to the wing, and at least one wheeled support positioned on the pivot arm and rotatable about a secondary rotational axis, wherein the pivot arm is rotatable to move the wheeled support relative to the tracked support between at least:
an operational position in which the wheeled support is positioned relative to the tracked support such that the secondary rotational axis is positioned within a horizontal plane and forward of the primary rotational axis, and
a turn position in which the wheeled support is positioned relative to the tracked support such that the secondary rotational axis is generally aligned with the horizontal plane and the primary rotational axis.

2. The farm implement of claim 1, wherein rotating the wheeled support into the turn position elevates the wing.

3. The farm implement of claim 1, further comprises a plurality of features spaced apart on the wing;
wherein the features are positioned proximate to a ground surface when the wing is positioned in the operational position.

4. The farm implement of claim 1, wherein the pivot arm is rotatable to position the wheeled support in an elevated position;
wherein the wheeled support is positioned such that the secondary rotational axis is rearward of the primary rotational axis in the elevated position.

5. The farm implement of claim 4, wherein the wing is positioned higher when the wheeled support is rotated into the elevated position then when the wheeled support is rotated into the turn position.

6. The farm implement of claim 1, wherein the primary rotational axis and the secondary axis are generally parallel.

7. The farm implement of claim 1, wherein the wheel support is positioned on the wing such that the wheel support is positioned a predetermined distance from the main carrier.

8. A method for maneuvering a farm implement having a main carrier supported by a tracked support rotatable about a primary rotational axis in a horizontal plane and a wing supported by a wheeled support mounted on a pivot arm rotatably connected to the wing, the wheeled support being rotatable about a secondary rotational axis, comprising:
rotating the pivot arm to position the wheeled support in an operational position to lower the wing, wherein the wheeled support is positioned relative to tracked support such that the secondary rotational axis is within a horizontal plane and forward of the primary rotational axis in the operational position;
rotating the pivot arm to position the wheeled support in a turn position to elevate the wing, wherein the wheeled support is positioned relative to tracked support such that the secondary rotational axis is generally aligned with the horizontal plane and the primary rotational axis in the turn position; and
turning the farm implement about the main carrier when the wheeled support is positioned in the turn position.

9. The method of claim 8, further comprising:
rotating the pivot arm to position the wheeled support in an elevated position to elevate the wing, wherein the secondary rotational axis is generally rearward of the primary rotational axis in the elevated position.

10. The method of claim 9, wherein the wing is positioned higher when the wheeled support is rotated into the elevated position then when the wheeled support is rotated into the turn position.

11. The method of claim 8, wherein the primary rotational axis and the secondary axis are generally parallel.

12. The method of claim 8, wherein the wheel support is positioned on the wing such that the wheel support is positioned a predetermined distance from the main carrier.

13. The method of claim 8, wherein the farm implement further comprises a plurality of features spaced apart on the wing;
wherein the features are positioned proximate to a ground surface when the wing is positioned in the operational position.

14. A system for positioning a wing pivotably connected to a main carrier supported by a tracked assembly rotatable about a primary rotational axis, comprising:
an arm mount positioned on the wing;

a pivot arm rotatably mounted to the arm mount such that the pivot arm extends from the wing; and at least one wheeled support positioned on the pivot arm and rotatable about a secondary rotational axis;

wherein the pivot arm is rotatable to move the wheeled support relative to the tracked support between at least:

an operational position in which the wheeled support is positioned relative to the tracked support such that the secondary rotational axis is positioned within a horizontal plane and forward of the primary rotational axis, and a turn position in which the wheeled support is positioned relative to the tracked support such that the secondary rotational axis is generally aligned with the horizontal plane and the primary rotational axis.

15. The system of claim 14, wherein the pivot arm is rotatable to position the wheeled support in an elevated position;

wherein the wheeled support is positioned such that the secondary rotational axis is rearward of the primary rotational axis in the elevated position.

16. The system of claim 15, wherein the wing is positioned higher when the wheeled support is rotated into the elevated position then when the wheeled support is rotated into the turn position.

17. The system of claim 14, wherein the primary rotational axis and the secondary axis are generally parallel.

18. The system of claim 14, wherein the arm mount is mounted on the wing such that the wheel support is positioned a predetermined distance from the main carrier.

* * * * *